(12) United States Patent  (10) Patent No.: US 7,572,041 B2
Watanabe et al.  (45) Date of Patent: Aug. 11, 2009

(54) VEHICLE LAMP

(75) Inventors: Jun Watanabe, Tokyo (JP); Daisuke Odagane, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 12/059,800

(22) Filed: Mar. 31, 2008

(65) Prior Publication Data
US 2008/0247186 A1 Oct. 9, 2008

(30) Foreign Application Priority Data
Mar. 30, 2007 (JP) ............................. 2007-091240

(51) Int. Cl.
*F21V 1/00* (2006.01)
(52) U.S. Cl. ...................... 362/509; 362/514; 362/520; 362/543
(58) Field of Classification Search ................. 362/509, 362/520–522, 543, 544
See application file for complete search history.

(56) References Cited
U.S. PATENT DOCUMENTS
5,126,924 A * 6/1992 Watanabe ................... 362/538
6,543,922 B2 * 4/2003 Komatsu et al. ............ 362/518
7,270,454 B2 * 9/2007 Amano ....................... 362/522
7,290,908 B2 * 11/2007 Amano et al. ............... 362/520
2003/0193815 A1 * 10/2003 Mishimagi .................. 362/522

FOREIGN PATENT DOCUMENTS
JP 4334802 11/1992

* cited by examiner

*Primary Examiner*—Ali Alavi
(74) *Attorney, Agent, or Firm*—Cermak Kenealy Vaidya & Nakajima LLP

(57) ABSTRACT

A vehicle lamp can include a position lamp with a favorable light distribution. The vehicle lamp can also include other lamp or lamps such as a headlight and the like. The vehicle lamp can include a primary light source, a secondary light source, a reflector, an inner lens and an outer lens. The primary light source can be used for the other lamp and the secondary light source can be used for the position lamp adjacent the other lamp. Light emitted from the secondary light source can be distributed to both sides of the outer lens using the reflector and the inner lens. Because the light can be emitted outside of the lamp from both sides of the outer lens, the position lamp can form a light distribution having a wide angle.

27 Claims, 4 Drawing Sheets

VEHICLE LAMP

This application claims the priority benefit under 35 U.S.C. § 119 of Japanese Patent Application No. 2007-091240 filed on Mar. 30, 2007, which is hereby incorporated in its entirety by reference.

BACKGROUND

1. Field

The presently disclosed subject matter relates to a vehicle lamp including a position lamp attached to the outside of a vehicle such as a car, and more particularly to a vehicle lamp including a position lamp in a headlight, an auxiliary headlight, a taillight and the like.

2. Description of the Related Art

A conventional position lamp is usually attached to the outside of a vehicle such as a car for the purpose of showing a width of the driven vehicle and for showing a following distance between other vehicles and the driven vehicle so that drivers of the other vehicles are aware of the position of the driven vehicle. The position lamp can be described as a clearance lamp in some cases and is often included in a headlight and a taillight in order to reduce both the cost and the space thereof. In this case, the position lamp is attached to the front of a vehicle along with the headlight and is attached to the rear of a vehicle along with the taillight.

However, according to a recent trend in vehicle design, because the four corners of the body of the vehicle are tending to be reduced in a circle or generally arcuate or aerodynamic configuration, the position lamp located at the outermost position with respect to other vehicle lamps is forced to move towards the inside of the vehicle lamp. Therefore, it becomes difficult to confirm the position lamp from the side of the vehicle and to also maintain the intended purpose of the position lamp. As it becomes easier to confirm the position lamp from the side of the vehicle, the position lamp is forced to be structured with a smaller space.

For instance, FIG. 4 is a top cross-section view showing an exempla of a vehicle lamp including a conventional position lamp, which is disclosed in Patent document No. 1 (Japanese Patent Application Laid Open H04-334802). According to the vehicle lamp 90 which includes the conventional position lamp 91, the position lamp 91 is configured to be located along the side surface of a vehicular body 80. Therefore, when a driver turns on a bulb 92 at twilight, rain, darkness, fog, night and the like, the driver can operate the vehicle lamp 90 as a position lamp using the bulb 92.

In this case, a cup 92a can be configured to change the light-emitting color of the bulb 92 in order to conform to a light distribution regulatory standard. In addition, an inner lens 93 and/or an outer lens 94 can also be colored with orange color, white color and the like so as to conform to a light distribution regulatory standard of a position or other lamp. Thus, the vehicle lamp 90 can show the vehicular width of the driven vehicle using the position lamp 91 to another vehicle, person, etc.

In the vehicle lamp 90 the side surface extends along the vehicular body 80 such that the front corner or the rear corner is reduced in a small circle, or arcuate shape, or aerodynamic shape, etc., and an outer lens 94 can include a protruding portion 94a thereon. Therefore, because a sight of the position lamp 91 can be expanded even in a diagonal view of the vehicle, it becomes easy to confirm the vehicular width of the vehicle.

Patent document No. 1: Japanese Patent Application Laid Open H04-334802

However, in the conventional structure using the above-described protruding portion 94a, the larger the area is reduced in the corners of the vehicle body, the larger the area of the protruding portion 94a becomes. Thus, the large protruding portion 94a causes a problem such as disfeaturing the vehicle (design/aesthetic limitation) and an adequate protruding portion 94a may sometimes not be included on the outer lens 94 by structural constraints.

The conventional structure of the vehicle lamp 90 can include the protruding portion on the inner lens 93. However, because the outer lens 94 is usually transparent in recent vehicles, the protruding portion on the inner lens 93 can be expressly seen from the outside via the outer lens 94. Therefore, the protruding portion on the inner lens 93 also causes a problem such as design limitation and spoiling of the beauty of the vehicle. In addition, another problem may exist when the inner lens 93 includes a corresponding protruding portion in that a protruding portion 94a may not always be able to be included on the outer lens 94 due to structural and/or design constraints.

Furthermore, the bulb 92 of the position lamp 91 may include an optical axis thereof that is positioned at an angle with respect to an optical axis of other light sources such as a headlight, stop lamp and the like. Thus, because a width in a side direction of the position lamp 91 becomes thick, another problem may exist in that a space for other lamp(s) adjacent the position lamp 91 becomes small.

The disclosed subject matter has been devised to consider the above and other problems, features and characteristics. An embodiment of the disclosed subject matter can include a position (e.g., a positioning, turning, back-up, or other lamp) with a favorable light distribution structured with a small space in a headlight, an auxiliary headlight, a taillight and the like, and the position lamp can be clearly visible even in a diagonal view of the vehicle, in which four corners of the vehicle are reduced while maintaining a beautiful outside appearance. Furthermore, because the position lamp allows a large space for other lamp(s) such as a headlight, a taillight and the like included in the vehicle lamp, the disclosed subject matter can expand the possibility of the vehicular lamp design.

SUMMARY

The presently disclosed subject matter has been devised in view of the above and other characteristics, desires, and problems in the art, and to make certain changes to the existing vehicle lamp. An aspect of the disclosed subject matter includes providing a vehicle lamp including a position lamp with a smaller space and a more favorable light distribution than a conventional position lamp along with a headlight, a stop lamp, a taillight and the like.

According to an aspect of the disclosed subject matter, a vehicle lamp including a position lamp can include: a primary light source having a direction of light-emission used for a lamp other than the position lamp; a secondary light source that is located adjacent the primary light source and is configured to use for the position lamp, a direction of light-emission thereof being directed at the direction towards the light-emission of the primary light source; a reflector located backwards the secondary light source and configured to reflect a light emitted from the secondary light source in the direction towards the light-emission of the secondary light source; an inner lens including both a first surface and an opposite surface located forwards the secondary light source, the first surface passing through a part of light emitted from the secondary light source, the opposite surface distributing other part of light emitted from the secondary light source in a direction opposite the part of light emitted from the secondary light source; and an outer lens including both a first end-to-side surface and the opposite end-to-side surface that is located forwards both the inner lens and the primary light source, wherein the part of light emitted from the secondary light source passed through the first surface of the inner lens is emitted to the outside through the first end-to-side surface and the other part of light emitted from the secondary light source distributed through the opposite surface of the inner lens is emitted to the outside through the opposite end-to-side surface.

According to the above-described exemplary vehicle lamp of the disclosed subject matter, both the inner lens and the outer lens may not have the protruding portion included thereon such as found in a conventional position lamp. In addition, the direction of light-emission of the secondary light source can be also corresponded to the direction of light-emission of the primary light source. Thus, the vehicle lamp can be configured with the position lamp even when four corners of the vehicular body are reduced in a large circle or made more aerodynamic, etc.

In the above-described exemplary vehicle lamp, the first surface of the inner lens can be eliminated and the first end-to-side surface of the outer lens can be configured to include the function of the first surface of the inner lens. In addition, the opposite surface of the inner lens can be also eliminated with the first surface and the outer lens can be configured to include the function of the opposite surface of the inner lens.

According to the above-described exemplary vehicle lamp, the structure of the inner lens can become simple or the inner lens can be finally eliminated. Thus, the assembly process for the vehicle lamp can become simple and the simple structure can result in a cost reduction for the vehicle lamp.

In the above-described exemplary vehicle lamp, a light path of the other part of light emitted from the secondary light source between the opposite surface of the inner lens and the opposite end-to-side inner surface of the outer lens can be configured to intersect with the direction of light-emission of the primary light source.

In the immediately above-described exemplary vehicle lamp, at least one of the first surface of the inner lens, the first end-to-side surface of the outer lens and the opposite end-to-side surface of the outer lens can be configured to include an optical diffusing configuration. In addition, the primary light source can be configured for use as a light source for a headlight and also the primary light source can be configured for use as a light source for a stop lamp, etc.

According to the above-described exemplary vehicle lamp, the position lamp can be configured to emit light on both end sides of the outer lens and at a wide angle. In addition, at least the one optical diffusing configuration can diffuse the light and can generate a splendid light. Thus, the position lamp can provide a favorable light distribution. Furthermore, because the position lamp can be structured with a small space and can allow a large space for other lamp(s) that is/are to be located adjacent the position lamp, the disclosed subject matter can expand the possibility of the vehicle lamp design.

BRIEF DESCRIPTION OF THE DRAWINGS

These and other characteristics and features of the disclosed subject matter will become clear from the following description with reference to the accompanying drawings, wherein.

DETAILED DESCRIPTION OF EXEMPLARY EMBODIMENTS

Figure 1:
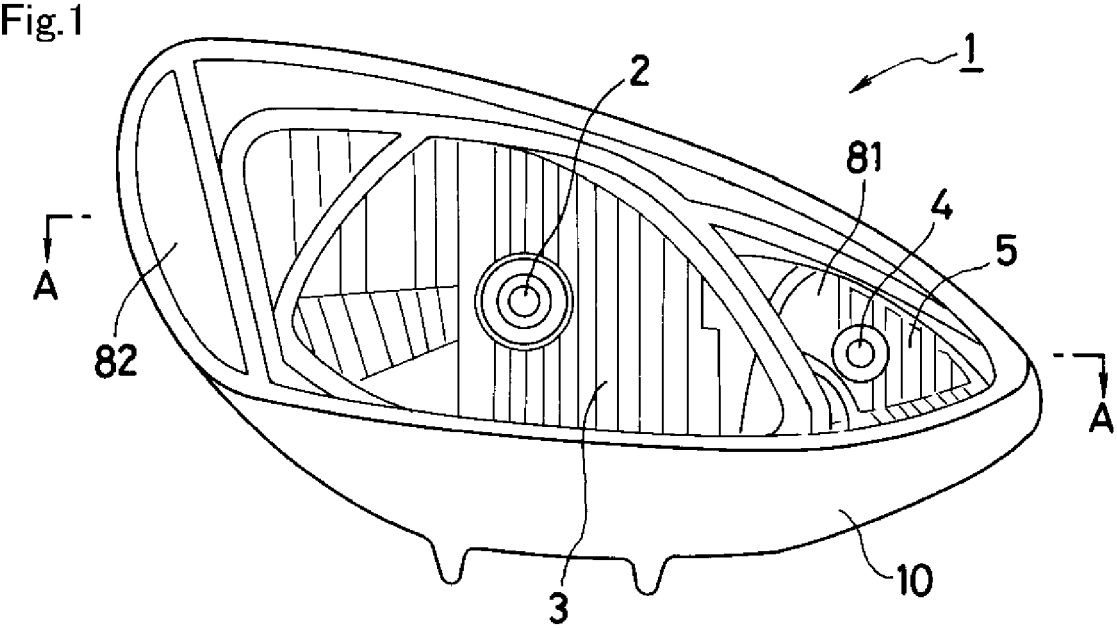
FIG. 1 is a front view showing an exemplary embodiment of a vehicle lamp made in accordance with principles of the disclosed subject matter.
Figure 2:
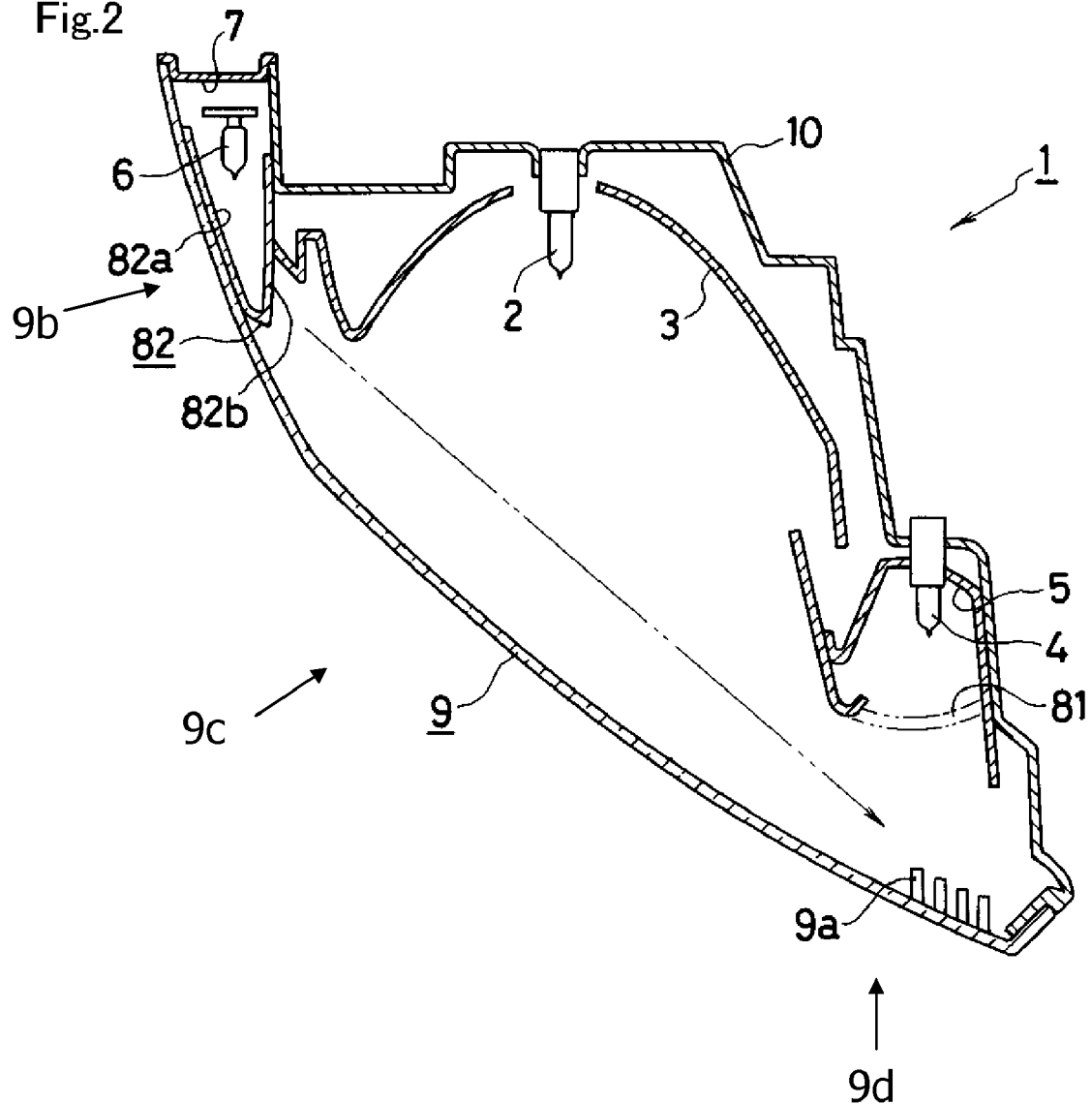
FIG. 2 is a top cross-section view taken along line A-A of FIG. 1.

The disclosed subject matter will now be described in detail with reference to FIGS. 1 to 3. FIG. 1 is a front view showing an exemplary embodiment of a vehicle lamp made in accordance with principles of the disclosed subject matter and FIG. 2 is a top cross-section view taken along line A-A of FIG. 1. The vehicle lamp 1 can include a position lamp in a right front direction of a driver along with a headlight in a housing 10.

For instance, a parabolic reflector 3 for the headlight can be configured to be located roughly in the centre of the housing 10. A primary light source 2 can also be configured to be located roughly in the centre of the reflector 3. The primary light source 2 can be configured with a halogen bulb having a double filament for a high beam and a low beam.

The disclosed subject matter is not limited to the above-described structure of the headlight. For example, a headlight for a low beam can be configured with a high intensity discharge lamp (HID lamp) as the primary light source 2 and an ellipsoidal reflector as the reflector 3, and a headlight for a high beam can be configured with a halogen bulb as the primary light source 2 and a parabolic reflector as the reflector 3, etc. The headlight can also be configured with other formations or combinations.

In addition, for example, both a light source 4 and a reflector 5 for a turn signal light can be configured to be located leftwards of the reflector 3 for the headlight and both a secondary light source 6 and a reflector 7 can be configured to be located rightwards of the reflector 3 in the headlight as viewed from a driver.

Furthermore, the vehicle lamp 1 of the disclosed subject matter can also include a position lamp along with a taillight in a housing 10. In this case, for instance, the primary light source 2 can be a light source for a stop lamp. Therefore, in the present disclosed subject matter, the primary light source 2 can be described as the light source used for a headlight, a fog lamp, stop lamp and other lamps not used for a position lamp, and the secondary light source 6 can be described as the light source that can be configured for use as a position lamp.

The above-described vehicle lamp 1 can be configured such that an inner lens is located forward of each light source in order to conform to various regulatory or other standards for lamps. For instance, a yellow inner lens 81 can be located forward of the light source 4 for the turn signal lamp, and an inner lens 82 of orange color can be located forward of the secondary light source 6 for the position lamp. The secondary light source 6 can also be an LED such as a white LED, a yellow LED and the like in order to conform to a standard of the position lamp.

In addition, the vehicle lamp 1 can be configured to include an outer lens 9 formed of transparent material and located on a front opening of the housing 10 in a see-through state. The lens 9 can include a primary surface 9c that is located between and separates a first end-to-side surface 9b from an opposite end-to-side surface 9d. the primary surface 9c can be located such that the optical axis of the primary light source intersects the primary surface 9c. The vehicle lamp 1 can also be configured such that the outer lens 9 is located forward of the above-described inner lenses 81, 82 and the above-described light sources 2, 4, 6 in order to conform to various regulatory or other standards for lamps. Therefore, the vehicle lamp 1 can operate as a vehicle lamp having a plurality of functions.

In the vehicle lamp 1 of the disclosed subject matter, the vehicle lamp 1 can share specific features on both the inner lens 82 located forwards the secondary light source 6 for the position lamp and the outer lens 9 located forward of both the inner lens 82 and the primary light source 2. The feature of the inner lens 82 will now be described in more detail. The inner lens 82 can be configured to form a V-shape that is open towards the reflector 7 in a top cross-section view as shown in FIG. 2. Thus, the inner lens 82 can be composed of a first surface 82a and an opposite surface 82b.

The first surface 82a can be configured to be located opposite a first end-to-side inner surface of the outer lens 9, which will be described later in detail, and can be configured to have a part of light emitted from the secondary light source 6 pass therethrough. Therefore, part of the light that is emitted from the secondary light source 6 can be emitted to the outside via the outer lens 9. In this case, the first surface 82a of the inner lens 82 can be eliminated and the first end-to-side surface of the outer lens 9 can include the function attributed to the first surface 82a of the inner lens 82.

When the vehicle lamp 1 includes the first surface 82a of the inner lens 82, the first surface 82a can be configured to include an optical diffusing configuration for diffusing at least part of the light emitted from the secondary light source 6. More specifically, an optical diffusing configuration of the first surface 82a can be configured with a plurality of concavo-convex formations. Therefore the first surface 82a of the inner lens 82 can diffuse at least part of both a direct light and an indirect light reflected from the reflector 7 in the light emitted from the secondary light source 6 for the position lamp.

Thus, the light emitted from the secondary light source 6 can be emitted to the outside via the end-to-side surface of the outer lens 9 while also being diffused to generate a splendid light. The above-described optical diffusing configuration can also be included in the end-to-side surface of the outer lens 9. Therefore, the first surface 82a of the inner lens 82 can be eliminated and allowed to be formed without the optical diffusing configuration.

When the vehicle lamp 1 is attached to a vehicular body, because the above-described light can be emitted from the outermost portion of the vehicle lamp 1, the width of the vehicle can be confirmed with confidence. This is especially true when the vehicle lamp 1 is attached to each of four corners of the vehicular body, because at least two of the above-described lights may be seen from any angle about the vehicle, and vehicular safety can be improved.

On the other hand, the opposite surface 82b of the inner surface 82 can be configured to be located on the opposite side of the first surface 82a. The opposite surface 82b can be configured to distribute other portions of the light emitted from the light source 6 in a bundled state on the opposite end-to-side inner surface on the opposite side of the first end-to-side of the outer lens 9.

More specifically, the opposite surface 82b can include an optical control configuration such as a plurality of prismatic formations, a Fresnel lens and the like, and therefore the opposite surface 82b can distribute the other portion of both the direct light and the indirect light reflected from the reflector 7 from the light emitted from the light source 6 on the opposite end-to-side inner surface of the outer lens 9 (the area located in the vicinity of convex portions 9a) using the optical control configuration.

In this case, the optical control configuration of the opposite surface 82b can be replaced and included in a guide lens in the outer lens 9. According to this alternative lamp structure of the vehicle lamp 1, the molding process may be more difficult for the outer lens 9 when it is integrated with the optical control configuration of the opposite surface 82b. However, the assembly process can become easy because the inner lens 82 can be eliminated.

The feature of the outer lens 9 will now be given. The outer lens 9 can be configured with an optical diffusing configuration on the opposite end-to-side inner surface thereof as shown in FIGS. 2 to 3. Therefore, the other portion of both the direct light and the indirect light reflected from the reflector 7 from the light emitted from the light source 6 and distributed by the optical control configuration of the inner lens 82 can be emitted to the outside via the outer lens 9 while also generating a splendid light that is diffused on the opposite end-to-side surface of the outer lens 9 using the optical diffusing configuration.

Figure 3:
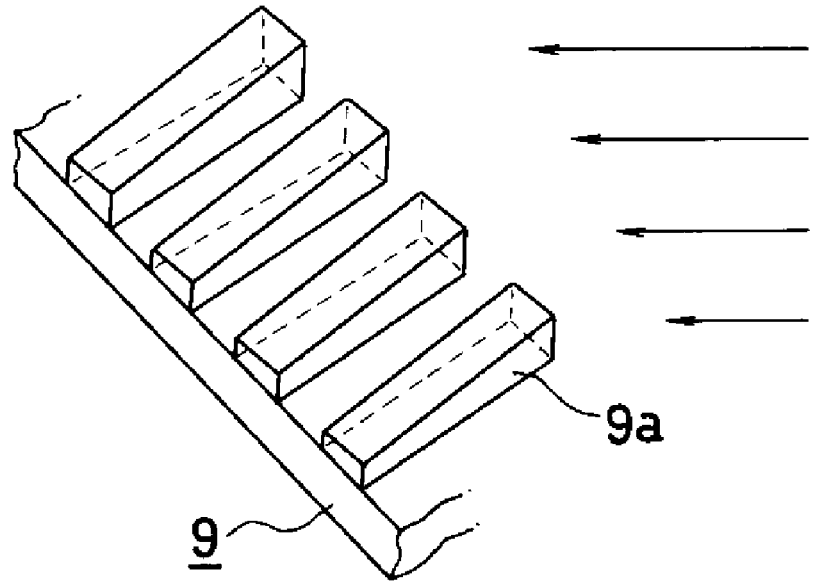
FIG. 3 is a explanatory diagram showing an optical convex portion in the vehicle lamp shown in FIG. 1.
Figure 4:
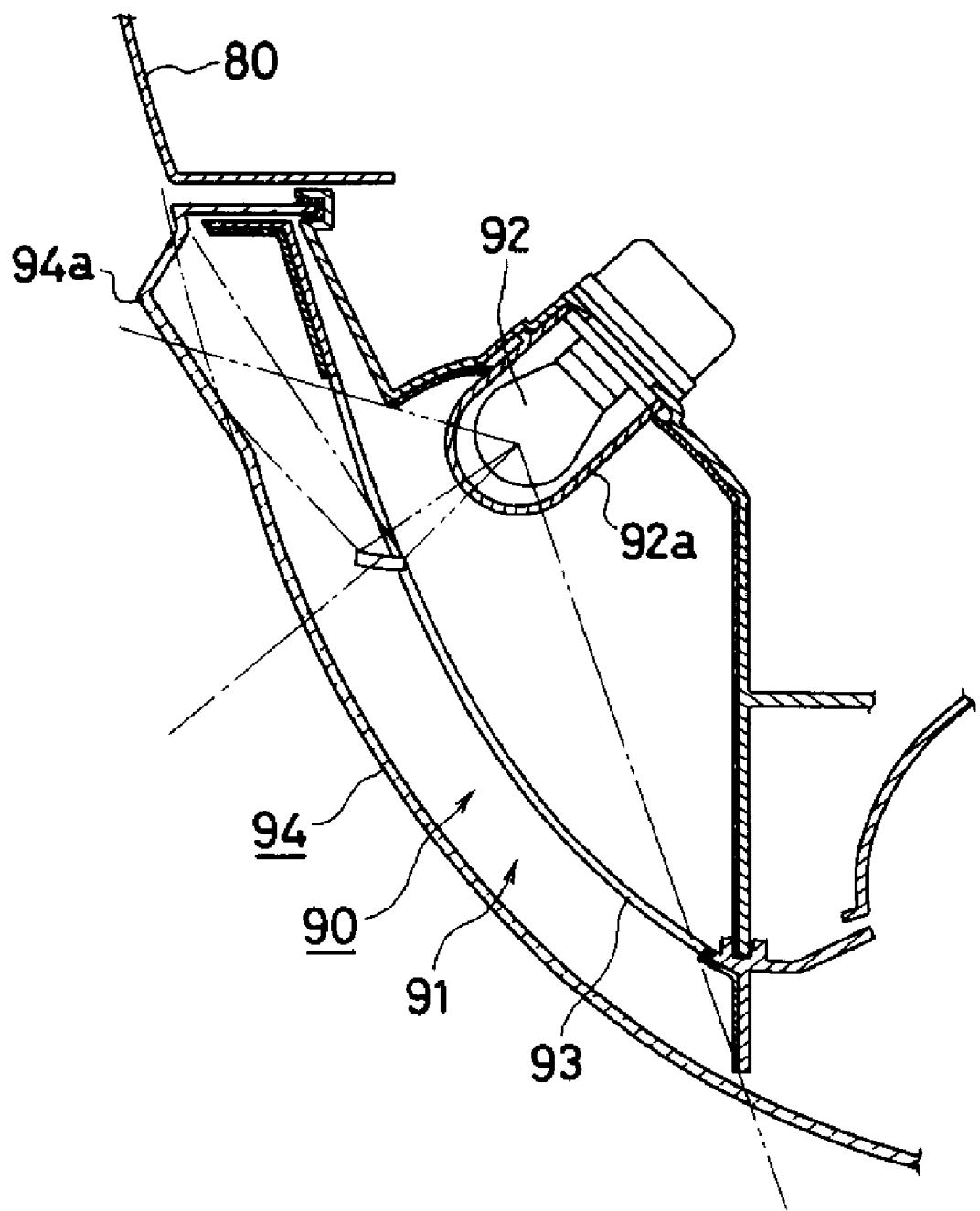
FIG. 4 is a top cross-section view of a vehicle lamp that includes a conventional position lamp.

More specifically, for instance, the optical diffusing configuration can be configured with a plurality of convex portions 9a having a prismatic function as shown in FIG. 3. The light that enters into each of the plurality of convex portions 9a can change the direction of light therein such that it can be emitted to the outside. In this case, each of the plurality of convex portions 9a can be formed as a rectangular block, in which a first surface for receiving light is thinner and an opposite surface is thicker in order to effectively receive the light directed from the optical control configuration of the inner lens 82.

Thus, the direction and number of the plurality of convex portions 9a cannot be limited and the shape of each of the plurality of convex portions 9a cannot be limited when providing a prismatic function. In addition, the plurality of convex portions 9a can also be configured with fine concavity (ies) and/or convexity(ies), and can include a concave-convex lens. And also the plurality of convex portion 9a can be configured with Fresnel lens.

When the vehicle lamp 1 is attached to a vehicle body, because the above-described light can be emitted from the innermost of the vehicle lamp 1, the vehicle width of the vehicle can be confirmed with confidence when viewed from an angle and even in a side view. When the vehicle lamp 1 is attached to each of four corners of the vehicle body, because at least two of the above-described portions of light may be seen from any angle, vehicular safety can be improved.

In addition, because the width of the vehicle can be confirmed by both the above-described portions of light emitted from the end-to-side surface to the outside and the other portion of light emitted from the opposite end-to-side surface of the outer lens 9 to the outside, the position lamp of the disclosed subject matter can provide a more favorable light distribution than a conventional position lamp.

In this case, the light path of the other portion of light (emitted from the secondary light source and between the optical control configuration of the opposite surface 82b of inner lens 82 and the opposite end-to-side inner surface of the outer lens in the vicinity of the convex portions 9a) can intersect with the direction of light-emission of the primary light source. However, because a distance between the part of light emitted to the outside from the first end-to-side surface of the outer lens 9 and the other part of light emitted to the outside from the opposite end-to-side surface of the outer lend 9 is relatively long, the position lamp can provide a favorable light distribution.

Furthermore, an optical axis of the secondary light source 6 can approximately correspond to an optical axis of the primary light source 2 and may not be required to be located at an angle with respect to each other. Thus, because the position lamp using the secondary light source 6 can be thin in a side direction and can be structured with a small space, the position lamp can allow a large space for other lamp(s) such as a headlight and the like that are to be included in the vehicle lamp 1.

According to the disclosed subject matter, both the inner lens and the outer lens may not require the conventional protruding portion included thereon. Thus, the vehicle lamp 1 can be configured with the position lamp having the above-described favorable light distribution in a small space even when four corners of the vehicle body are reduced in a large circle, arcuate surface or the like. In addition, because the vehicle lamp 1 can include other lamps such as a headlight, a stop lamp and the like using a large space along with the above-described position lamp, the vehicle lamp 1 can expand the possibility of the vehicle lamp design.

In the above-described exemplary vehicle lamp 1, the vehicle lamp 1 in a right front direction of a driver is described and shown. However, the disclosed subject matter can also be incorporated into a lamp located in the left front direction of a driver and/or both sides in the rear direction of a driver. Various modifications of the above disclosed embodiments can be made without departing from the spirit and scope of the presently disclosed subject matter.

While there has been described what are at present considered to be exemplary embodiments of the invention, it will be understood that various modifications may be made thereto, and it is intended that the appended claims cover such modifications as fall within the true spirit and scope of the invention. All conventional art references described above are herein incorporated in their entirety by reference.

What is claimed is:

1. A vehicle lamp including a position lamp, comprising:
   a primary light source having a first optical axis and configured to emit light in a primary direction along the first optical axis;
   a secondary light source located adjacent the primary light source and configured for use as the position lamp, the secondary light source having a secondary optical axis and configured to emit light in a secondary direction along the secondary optical axis;
   a reflector located rearward of the secondary light source with respect to the secondary direction and configured to reflect light emitted from the secondary light source into the secondary direction;
   an inner lens including a first surface and an opposite surface located forward of the secondary light source with respect to the secondary direction, the first surface configured to allow a first portion of light emitted from the secondary light source to pass, and the opposite surface configured to allow a second portion of light emitted from the secondary light source to pass, the first portion of light being different from the second portion of light emitted from the secondary light source; and
   an outer lens including a first end-to-side surface and an opposite end-to-side surface, wherein when the secondary light source is operated the first portion of light emitted from the secondary light source passes through the first surface of the inner lens and is emitted outside of the lamp through the first end-to-side surface of the outer lens and the second portion of light emitted from the secondary light source is emitted outside the lamp through the opposite end-to-side surface of the outer lens.

2. A vehicle lamp including a position lamp, comprising:
   a primary light source having a first optical axis and configured to emit light in a primary direction along the first optical axis;
   a secondary light source located adjacent the primary light source and configured for use as the position lamp, the secondary light source having a secondary optical axis and configured to emit light in a secondary direction along the secondary optical axis;
   a reflector located rearward of the secondary light source with respect to the secondary direction and configured to reflect light emitted from the secondary light source into the secondary direction;
   an inner lens located in front of the secondary light source and including a portion configured to allow an opposing portion of light emitted from the secondary light source to be transmitted; and
   an outer lens including a first end-to-side surface and an opposite end-to-side surface, wherein when the secondary light source is operated a first portion of light emitted from the secondary light source that is different from the opposing portion emitted from the secondary light source is emitted to an area outside of the vehicle lamp through the first end-to-side surface and the opposing portion of light emitted from the secondary light source transmitted through the inner lens is emitted to the area outside of the vehicle lamp through the opposite end-to-side surface of the outer lens.

3. A vehicle lamp including a position lamp, comprising:
   a primary light source having a first optical axis and configured to emit light in a primary direction along the first optical axis;
   a secondary light source located adjacent the primary light source and configured for use as the position lamp, the secondary light source having a secondary optical axis and is configured to emit light in a secondary direction along the secondary optical axis;
   a reflector located rearward of the secondary light source with respect to the secondary direction and configured to reflect light emitted from the secondary light source into the secondary direction; and
   an outer lens including a first end-to-side surface, an opposite end-to-side surface, and a guide lens, the outer lens being located in front of the primary light source and configured such that when the secondary light source is operated a first portion of light emitted from the secondary light source is emitted to an area outside of the vehicle lamp via the first end-to-side surface, a second portion of light emitted from the secondary light source and different from the first portion of light is directed towards the opposite end-to-side surface via the guide lens, and the second portion of light passes through the opposite end-to-side surface to the area outside the vehicle lamp.

4. The vehicle lamp including a position lamp according to claim 1,
   wherein a light path of the second portion of light emitted from the secondary light source and directed between the opposite surface of the inner lens and the opposite end-to-side surface of the outer lens intersects with the primary direction of light emitted from the primary light source.

5. The vehicle lamp including a position lamp according to claim 2,
wherein a light path of the opposing portion of light emitted from the secondary light source and directed between the inner lens and the opposite end-to-side surface of the outer lens intersects with the primary direction of light emitted from the primary light source.

6. The vehicle lamp including a position lamp according to claim 3,
wherein a light path of the second portion of light emitted from the secondary light source and directed between the guide lens of the outer lens and the opposite end-to-side surface of the outer lens intersects with the primary direction of light emitted from the primary light source.

7. The vehicle lamp including a position lamp according to claim 1,
wherein at least one of the first surface of the inner lens, the first end-to-side surface of the outer lens and the opposite end-to-side surface of the outer lens includes an optical diffusing structure.

8. The vehicle lamp including a position lamp according to claim 2,
wherein at least one of the first end-to-side surface of the outer lens and the opposite end-to-side surface of the outer lens includes an optical diffusing structure.

9. The vehicle lamp including a position lamp according to claim 3,
wherein at least one of the first end-to-side surface of the outer lens and the opposite end-to-side surface of the outer lens includes an optical diffusing structure.

10. The vehicle lamp including a position lamp according to claim 4,
wherein at least one of the first surface of the inner lens, the first end-to-side surface of the outer lens, and the opposite end-to-side surface of the outer lens includes an optical diffusing structure.

11. The vehicle lamp including a position lamp according to claim 5,
wherein at least one of the first end-to-side surface of the outer lens and the opposite end-to-side surface of the outer lens includes an optical diffusing structure.

12. The vehicle lamp including a position lamp according to claim 6,
wherein at least one of the first end-to-side surface of the outer lens and the opposite end-to-side surface of the outer lens includes an optical diffusing structure.

13. The vehicle lamp including a position lamp according to claim 7,
wherein the primary light source is configured for use as a light source for a headlight.

14. The vehicle lamp including a position lamp according to claim 8,
wherein the primary light source is configured for use as a light source for a headlight.

15. The vehicle lamp including a position lamp according to claim 9,
wherein the primary light source is configured for use as a light source for a headlight.

16. The vehicle lamp including a position lamp according to claim 1,
wherein the opposite end-to-side surface of the outer lens includes at least one convex projection extending from an interior surface of the outer lens into the vehicle lamp, the at least one convex projection configured to redirect the second portion of light from the secondary light source into a direction substantially parallel with the primary direction of the primary light source.

17. The vehicle lamp including a position lamp according to claim 2,
wherein the opposite end-to-side surface of the outer lens includes at least one convex projection extending from an interior surface of the outer lens into the vehicle lamp, the at least one convex projection configured to redirect the opposing portion of light from the secondary light source into a direction substantially parallel with the primary direction of the primary light source.

18. The vehicle lamp including a position lamp according to claim 3,
wherein the opposite end-to-side surface of the outer lens includes at least one convex projection extending from an interior surface of the outer lens into the vehicle lamp, the at least one convex projection configured to redirect the second portion of light received from the secondary light source into a direction substantially parallel with the primary direction of the primary light source.

19. The vehicle lamp including a position lamp according to claim 7,
wherein the primary light source is configured for use as a light source for a stop lamp.

20. The vehicle lamp including a position lamp according to claim 8,
wherein the primary light source is configured for use as a light source for a stop lamp.

21. The vehicle lamp including a position lamp according to claim 9,
wherein the primary light source is configured for use as a light source for a stop lamp.

22. The vehicle lamp including a position lamp according to claim 1,
wherein the secondary optical axis is substantially parallel with the first optical axis of the primary light source.

23. The vehicle lamp including a position lamp according to claim 2,
wherein the secondary optical axis is substantially parallel with the first optical axis of the primary light source.

24. The vehicle lamp including a position lamp according to claim 3,
wherein the secondary optical axis is substantially parallel with the first optical axis of the primary light source.

25. The vehicle lamp including a position lamp according to claim 1,
wherein the outer lens includes a primary surface located between and spacing the first end-to-side surface from the opposite end-to-side surface, the optical axis of the primary light source intersecting the primary surface.

26. The vehicle lamp including a position lamp according to claim 1,
wherein the first surface of the inner lens is located at an angle with respect to the opposite surface such that the first surface and the opposite surface form a substantially V-shaped configuration for the inner lens.

27. The vehicle lamp including a position lamp according to claim 1,
wherein the first end-to-side surface and the opposite end-to-side surface of the outer lens are located in front of both the inner lens and the primary light source with respect to the primary direction.

* * * * *